United States Patent [19]
Floyd et al.

[11] Patent Number: 5,993,186
[45] Date of Patent: Nov. 30, 1999

[54] SINGLE SCREW EXTRUDER

[75] Inventors: William W. Floyd; Ricky A. Wells, both of Mt. Vernon, Ind.

[73] Assignee: General Electric Company, Pittsfield, Mass.

[21] Appl. No.: 08/920,962

[22] Filed: Aug. 29, 1997

[51] Int. Cl.$^6$ ................................................. B29C 47/60
[52] U.S. Cl. ...................... 425/190; 366/79; 425/376.1; 425/461
[58] Field of Search .................................... 425/186, 190, 425/192 R, 204, 208, 376.1, 461; 366/88, 89, 90, 81, 79

[56] References Cited

U.S. PATENT DOCUMENTS

| | | | |
|---|---|---|---|
| 3,121,914 | 2/1964 | Olson et al. | 425/208 |
| 3,734,635 | 5/1973 | Blach et al. | 425/376.1 |
| 3,824,875 | 7/1974 | Willert et al. | |
| 5,129,729 | 7/1992 | Geyer | 366/89 |
| 5,217,303 | 6/1993 | Geyer | 366/88 |
| 5,551,777 | 9/1996 | Tjahjadi et al. | 366/79 |

FOREIGN PATENT DOCUMENTS

| | | |
|---|---|---|
| 1067262 | 5/1967 | United Kingdom . |
| 1266584 | 3/1972 | United Kingdom . |
| 1387467 | 3/1975 | United Kingdom . |

OTHER PUBLICATIONS

85–051061/198509 (Abstact), Feb. 21, 1985, WPI.
No.86–118193/198618 (abstract), Oct. 15, 1985, WPI.
No. 82–JO965E/198227 (Abstract), Feb. 7, 1982, WPI.
No. 94–337834/199442 (Abstract), Sep. 20, 1994, WPI.
No. 89–027430/198904 (Abstract), Feb. 7, 1988, WPI.
Machinery's Handbook, 23$^{rd}$ Ed., by Oberg, Jones, Horton, pp. 2017–2033.

*Primary Examiner*—Harold Pyon
*Assistant Examiner*—Joseph Leyson

[57] ABSTRACT

A single screw extruder of the type having a drive shaft coupled to the screw for rotational movement wherein the improvement comprises coupling the drive shaft to one end of the screw through a plurality of splines on the screw.

7 Claims, 2 Drawing Sheets

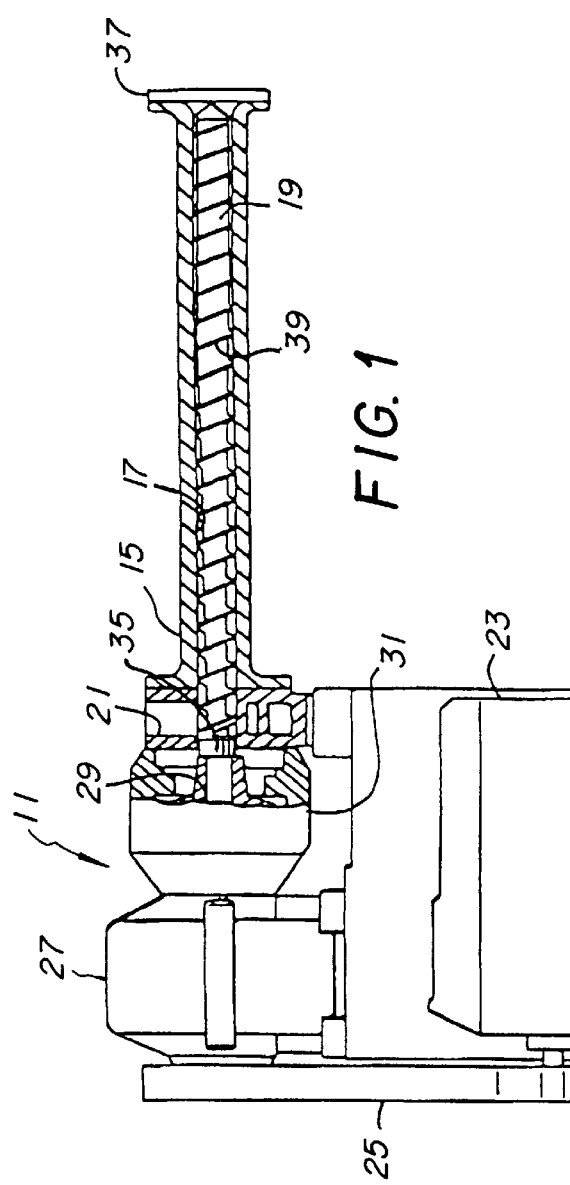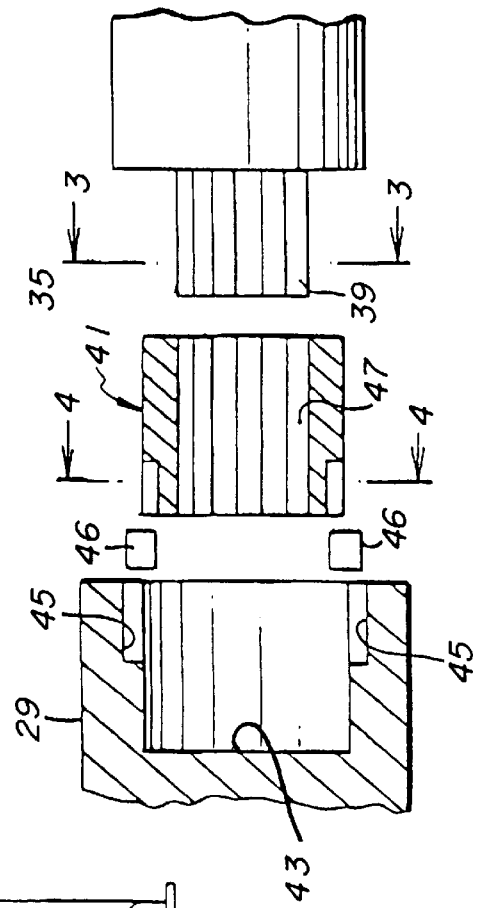

SINGLE SCREW EXTRUDER

FIELD OF INVENTION

The present invention relates to a single screw extruder.

BACKGROUND OF THE INVENTION

Thermoplastics resins are typically formed by extruding the material through a through a die which shapes the material. The raw material is placed in a hopper where it is moved into and through a chamber by a screw. The mechanical action of the feeder screw heats and feeds the material through chamber which is typically in the shape of a barrel. The heated and compressed material is forced through the die at the discharge end of the extruder. The extruded part assumes the cross-sectional shape of a die.

In a single screw extruder, the screw typically has an external diameter corresponding to outer edges of the helical threads or flights. The flights may be under sized in relation to the barrel in the feed or hopper area so as to reduce feedthroat friction. Typically, a single keyway in the shaft area of the screw matches a keyway in a sleeve portion of a drive shaft so that a key positioned in the matching keyways is utilized to transmit rotational movement from the drive shaft to the screw. The key is a separate piece of rectangular metal which fits into the matching keyways. A disadvantage attendant with the use of keys is that they may be lost or misplaced. Also, worn keys can contribute to screw wobble.

As the viscosity of the thermoplastic material increases, it has been observed, that in single screws of the above described type, radial screw movement or wobble may develop. Clearance in the feed area between the outside diameter of the screw and the inside of the barrel permits movement of screw. As the screw wears, metal may be removed between the exterior of the screw and the inside of the barrel. This creates additional clearance which may cause even more wobble or radial movement.

Hence, it is desirable, to reduce radial movement without reducing clearance in the feed screw area which clearance is desirable for extruding higher viscosity materials. Reduction in radial movement beneficially reduces screw wear and contamination of the finished product with residual metal particles from the screw or barrel. Reduction in radial movement also helps maintain tighter tolerances between the screw and the barrel and can result in higher feed rates. Any reduction in radial movement can result in a more efficient powder feed and less wear on single screw extruders.

SUMMARY OF THE INVENTION

It is an object of the present invention to provide a single screw extruder with enhanced coupling to a drive shaft to reduce radial movement of the feed screw when subjected to high loading.

Other and additional objects will become apparent from the description as set forth in the specification.

In accordance with the present invention, there is provided a single screw extruder of the type having a drive shaft coupled to the screw for rotational movement wherein the improvement comprises coupling the drive shaft to one end of the screw through a plurality of splines on the screw.

According to preferred embodiments, the respective ends of the screw is coaxially aligned with the drive shaft and coupled together with a sleeve having a plurality of serrations matching the respective splines on the screw.

DESCRIPTION OF THE DRAWINGS

FIG. 1 is a cross section of single screw extruder 11.

FIG. 2 is an enlarged view assembly view showing the interconnection of the drive shaft, key, sleeve, and screw.

DESCRIPTION OF THE PREFERRED EMBODIMENT

Figure 3:
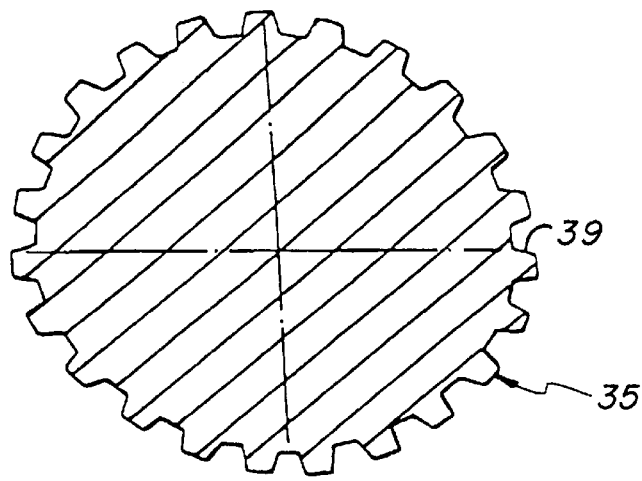
FIG. 3 is an enlarged view showing in cross-section an end portion of an extruder screw along section 3—3 of FIG. 2.
Figure 4:
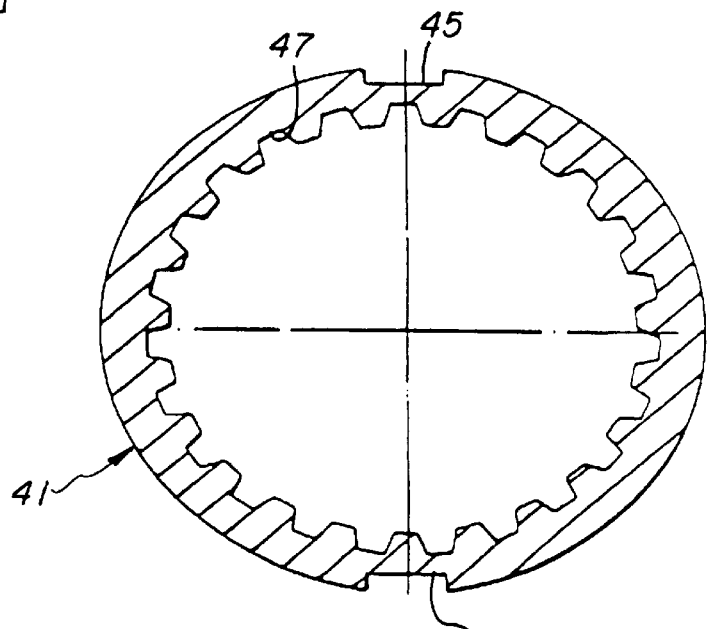
FIG. 4 is an enlarged view showing in cross-section a sleeve along section 4—4 of FIG. 2.
Figure 5:
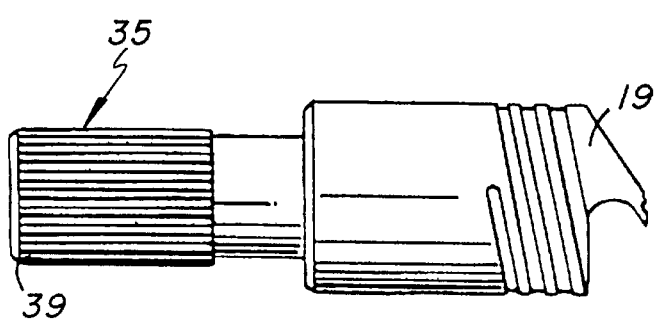
FIG. 5 is an enlarged view of a portion of the extruder screw.

FIG. 1 is illustrative of a standard extrusion molding machine. The extruder 11 includes a housing 15 having a channel 17 with a screw 19 mounted for rotation along an axis interior the housing 15. It is contemplated that the channel 17 and the screw 19 may assume various shapes for accomplishing mixing, conveying, and heating functions. Various shapes are illustrated in U.S. Pat. No. 5,551,777 to Tjahjadi et al. At one end of the opening, a hopper 21 is utilized for feeding material to be extruded into the rear portion of the screw 19. Typically, helical threads mounted on the screw 19 are positioned for moving material from the rear portion of the screw 19 to a forward portion. As the material or feedstock is conveyed along the screw 19, it is heated by frictional forces caused by rotation of the screw 19.

At the rear of the extruder 11, a motor 23 is connected through a belt drive 25 to a gear box 27 which includes the appropriate gears to reduce the rotational speed of drive shaft 29. The bearing housing 31 includes appropriate bearings which mount the drive shaft 29 for rotational movement about an axis of rotation. A drive connection 35 is provided between the drive shaft 29 and the screw 19.

Typically, at the forward end of the channel 17 and spaced from the forward end of the screw 19, a member 37 is mounted transverse to the flow of feedstock. The member 37 is mounted in place in a recess between housing 15 and the die body. The member 37 includes a plurality of openings for the passage of feedstock and acts to create a back pressure which contributes to the mixing and heating of the feedstock and also serves to filter impurities from the feedstock.

In some cases, the clearance between the exterior of the feed screw 19 and the inside of the channel 17 in the hopper area may be greater than the clearance in the area of the member 37 for reducing the frictional forces in the hopper area. The external diameter of the feed screw 19 may be smaller then the internal diameter of the central opening forming the channel 19. Various screw 19 and channel 17 configurations are contemplated for use with the present invention.

A die body (not shown) is typically mounted on the forward end of the housing 15. The mounting is conventionally made by bolting or clamping a flange on the die body to a flange on the housing 15. The die body includes a tapered central and axially aligned opening which throttles the feedstock. At the die outlet a die plate has an opening with the desired cross sectional shape of the lineal profile to be extruded. Typically pressures within the extruder 11 is in excess of 600 lbs/sq. inch, and is the present invention is especially suited where pressures may be equal to or exceed 800 lbs/sq. inch.

In accordance with the present invention, there is provided a single screw 19 extruder of the type having a drive shaft coupled to the screw 19 for rotational movement wherein the improvement comprises coupling the drive shaft to one end of the screw 19 through a plurality of splines 39 on the screw 19.

FIG. 2 illustrates an assembly view of the coupling mechanism between the drive shaft 29 and an end portion of the screw 19. The drive shaft 29, the sleeve 41 and the screw 19 are aligned along a common axis of rotation. An end portion of the drive shaft 29 includes a recessed portion 43 having an annular shape. The inside surface has a circular cross-section with a pair of opposing and radially projection keyways 45. The keyways 45 are rectangular slots which are provided along the inside surface for accommodating keys 46. Typically, commercially available extruders have drive shafts that are provided with annular recessed portions having keyways. The typical connection with the screw 19 is through similarly mounted keyways on the an end portion of the screw 19.

According to the present invention, connection with the screw 19 is made through a spline drive connection 35. An end portion of the screw 19 which has a reduced diameter is provided with a plurality of axially aligned splines 39. The individual splines 39 extend lengthwise along the end portion parallel to the axis of rotation and project outwardly in a radial direction from the axis of rotation. An annual shaped sleeve 41 includes a plurality of axially aligned matching serrations 47 on the interior surface which mesh with the radially projecting splines 39. Preferably the external splines 39 are on the end portion of the screw 19 but other modifications are contemplated. Although external splines 39 are preferred, it is contemplated that the screw 19 may be provided with internal serrations or internal splines. It is also contemplated the drive shaft 29 may be directly provided with serrations or splines, as the case may be, which match the respective splines or serrations on the screw 19. In this case, the use of a sleeve 39 is not necessitated.

The nomenclature referred to is as set forth in Machinery's Handbook, 23rd Edition, Industrial Press Inc., New York, pages 2025–2033. Spline is a machine element consisting of spline teeth or spaces equally spaced around a circle or circumference of a shaft or the interior of an annulus, cylinder, or sleeve 39. An internal spline is a spline formed on the inner surface of a cylinder. An involute spline is one having teeth with involute profiles. The major diameter is the diameter corresponding to the outer surface or top of the splines. The minor diameter is the diameter corresponding to the inner surface or bottom of the space width between the splines.

With an involute spline, the individual splines or teeth project outwardly in radial direction from the surface corresponding to the minor diameter to a surface corresponding to a major diameter. The depth of engagement is the radial distance from the minor diameter to the major diameter. The pitch circle is the reference circle from which transverse spline tooth dimensions are constructed. The pitch diameter is the diameter of the pitch circle. The pitch circle is a reference circle from which transverse spline tooth dimensions are constructed. The pitch circle is positioned between the minor and major diameter. The pitch diameter is the diameter of the pitch circle. The pressure angle is the angle between a line tangent to an involute and a radial line through the point of tangency. Typically measured at the intersection of the pitch circle and the tangent line of the involute.

Preferably each space of an internal spline has substantially the same width as each tooth for mating thereof to form the appropriate connection. To allow an external spline to fit in any position, all spaces of the internal splines or serrations are desirably widened by the amount of interference. The effective space width is the tooth thickness of the perfect mating external spline. The effective space width of the internal spline minus the effective tooth thickness of the external spline is the effective clearance. This defines the fit of the mating parts. It is desirable to have a small clearance for ease of mating.

The individual splines or each tooth which extends between the major and minor diameter is preferably symmetrical about a center line projecting from the axis of rotation. The symmetrical nature about a projected radius is desirable for ease of machining. Preferably 4 to 40, more preferably 12 to 30 splines are equally spaced about the periphery or circumference of the end portion of the screw 19.

The basic space width is the basic space width for 30-degree pressure angle splines, i.e. half the circular pitch. The teeth are proportioned so that the external tooth, at it base, has about the same thickness as the internal tooth at the minor diameter. This results in greater minor diameters than those of comparable involute splines of 30 degree pressure angle. The preferred pressure angle for the spline drive of the present invention is from about 25 to about 35 degrees with 27 to 33 being even more preferable. The minor diameter is preferably from about 1.5 to about 10 inches, more preferably from 3.5 to about 8 inches.

The present invention is especially suitable for extruders in which the Length of the screw divided by the Diameter of the screw, i.e. L/D ratio, is from 20 to 40. The drive connection 35 of the present invention has utility to reduce the tendency of long screws to wobble. Additionally, the drive connection 35 of the present invention is particularly desirable for single screw extruders where the clearance between the internal surface of the channel 17 and the exterior surface of the screw has a low clearance since it is desirable to reduce wobble and hence wear in extruders of this nature. The drive connection 35 of the present invention is preferably utilized with extruders having clearances from 0.0001 to 0.05.

The present invention is effective in effective for use with high viscosity resins, especially resins having a viscosity greater than 3,000 poise. Typical thermoplastic materials which may be extruded are high temperature thermoplastics such as acrylonitrile-butadiene-styrene (ABS), polycarbonate, polycarbonate/ABS blend, a co-polycarbonate-polyester, acrylic-styrene-acrylonitrile (ASA), acrylonitrile-(ethylene-propylene diamine modified) styrene (AES), polyalkylene terephthalate such as polybutylene terephthalate (PBT) or polyethylene terephthalate (PET) or blends thereof, blends of polyphenylene ether/polyamide (NORYL GTX Registered TM from General Electric Company), blends of polycarbonate/polybutylene terephthalate and impact modifier (XENOY Registered TM resin from General Electric Company), blends of polycarbonate/PBT/PET, etc., or blends thereof with other additives such as fillers, impact modifiers, pigments, stabilizer, reinforcing agents, etc. It is contemplated that PVC can also be use.

We claim:

1. A single screw extruder comprising a screw and a drive shaft, said screw having an end portion including a plurality of splines, said screw being coaxially aligned with said drive shaft and coupled thereto, said drive shaft having an end portion having a recess therein, a sleeve having a plurality of serrations matching the respective splines on said screw, said sleeve being fixedly disposed in said recess for coupling said screw to said drive shaft.

2. A single screw extruder according to claim 1 wherein said extruder includes a housing having a central opening for forming a channel, said screw being helical and mounted for rotation along an interior axis of said channel.

3. A single screw extruder according to claim 2 wherein said sleeve has an annular shape with an interior surface comprising said plurality of matching serrations on the interior surface which mesh with said splines.

4. A single screw extruder according to claim 3 wherein said splines project outwardly in radial direction.

5. A single screw extruder according to claim 4 wherein each spline is symmetrical about a center line projecting from the axis of rotation.

6. A single screw extruder according to claim 1 having 4 to 30 splines.

7. A single screw extruder according to claim 1 having 12 to 24 splines.

\* \* \* \* \*